(12) United States Patent
Kim et al.

(10) Patent No.: US 9,082,039 B2
(45) Date of Patent: Jul. 14, 2015

(54) METHOD AND APPARATUS FOR RECOGNIZING A CHARACTER BASED ON A PHOTOGRAPHED IMAGE

(71) Applicant: Samsung Electronics Co., Ltd., Gyeonggi-do (KR)

(72) Inventors: Sang-Ho Kim, Gyeonggi-do (KR); Woo-Sung Kang, Gyeonggi-do (KR); Mu-Sik Kwon, Seoul (KR); Jung-Rim Kim, Gyeonggi-do (KR); Jeong-Wan Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 143 days.

(21) Appl. No.: 13/712,480

(22) Filed: Dec. 12, 2012

(65) Prior Publication Data

US 2013/0148899 A1 Jun. 13, 2013

(30) Foreign Application Priority Data

Dec. 13, 2011 (KR) ........................ 10-2011-0133502

(51) Int. Cl.
*G06K 9/46* (2006.01)
*G06K 7/10* (2006.01)
(Continued)

(52) U.S. Cl.
CPC .......... *G06K 9/4652* (2013.01); *G06K 9/00463* (2013.01); *G06K 9/38* (2013.01); *G06K 9/46* (2013.01)

(58) Field of Classification Search
CPC ............ G06K 9/325; G06K 9/38; G06K 9/40
See application file for complete search history.

(56) References Cited

U.S. PATENT DOCUMENTS

| 5,408,337 | A | 4/1995 | Kanda |
| 2003/0184665 | A1 | 10/2003 | Berstis |

(Continued)

FOREIGN PATENT DOCUMENTS

| EP | 1 473 658 | 11/2004 |
| JP | 2011-47808 | 3/2011 |

OTHER PUBLICATIONS

Ender Tekin et al., "Real-Time Detection and Reading of LED/LCD Displays for Visuallly Impaired Persons", 2011 IEEE Workshop on Applications of Computer Vision (WACV), Jan. 5, 2011.

(Continued)

*Primary Examiner* — Stephen R Koziol
*Assistant Examiner* — Amandeep Saini
(74) *Attorney, Agent, or Firm* — The Farrell Law Firm, P.C.

(57) ABSTRACT

An apparatus and method for recognizing a character based on a photographed image. The apparatus includes an image determining unit, an image effect unit, a binarizing unit and a character recognizing unit. The image determining unit is configured to select, from an input image, a Region Of Interest (ROI) to be used for image analysis when the input image is input, and to analyze the selected ROI to determine a type of the input image. The image effect unit is configured to apply to the input image, an image effect for distinguishing a character region and a background region in a display screen if the type of the input image indicates that the input image is obtained by photographing a display screen. The binarizing unit is configured to binarize the input image or the output of the image effect unit according to the determined type of the input image. The character recognizing unit is configured to recognize a character from the binarized input image.

10 Claims, 11 Drawing Sheets

(51) Int. Cl.
  *G06K 9/38* (2006.01)
  *G06K 9/00* (2006.01)

(56) References Cited

U.S. PATENT DOCUMENTS

2004/0240737 A1* 12/2004 Lim et al. ............... 382/182
2011/0188783 A1* 8/2011 Minoni et al. ........... 382/314

OTHER PUBLICATIONS

Hideaki Goto et al., "Screen Pattern Removal for Character Pattern Extraction from High-Resolution Color Document Images", Proceedings of the 17th International Conference on Pattern Recognition, Aug. 23, 2004.

Hong Cao et al., "Identification of Recaptured Photographs on LCD Screens", 2010 IEEE International Conference on Acoustics Speech and Signal Processing (ICASSP), Mar. 14, 2010.

* cited by examiner

METHOD AND APPARATUS FOR RECOGNIZING A CHARACTER BASED ON A PHOTOGRAPHED IMAGE

PRIORITY

This application claims priority under 35 U.S.C. §119(a) to an application filed in the Korean Intellectual Property Office on Dec. 13, 2011 and assigned Serial No. 10-2011-0133502, the content of which is incorporated herein by reference.

BACKGROUND OF THE INVENTION

1. Field of the Invention

The present invention relates generally to a method and apparatus for recognizing a character, and more particularly to a method and apparatus for recognizing a character in a display screen image photographed by a camera.

2. Description of the Related Art

As smartphones become more popular, the use of applications for recognizing characters from an image obtained by photographing a document, a business card, and the like through a camera of a smartphone has increased. Here, an optical character recognition function from among functions used for recognizing a character may have a high probability of being utilized as a multi-modal software input panel that provides another basic input function to the smartphone, along with a touch keypad, a voice recognition, and the like.

A method of recognizing a character image photographed by a mobile camera provides a user with a function of transferring a result of the recognition to another user via an e-mail or a text message, a function of connecting to the Internet, and the like. Specifically, when a character displayed on a computer screen is recognized by photographing the character through the camera, a user may readily transfer various character information from a computer to a smartphone and use the information for various purposes, thus improving user convenience.

The method of recognizing a character on the computer screen through use of a mobile camera requires a technical method that is different from a conventional method for recognizing a book, a magazine, and the like. When a character displayed on a computer screen is photographed through use of a high definition mobile camera, the resolution of a camera image is usually greater than the resolution of the computer screen which results in image noise that deteriorates a character recognition performance on a location of each pixel. Thus, the use of a conventional character recognition system is limited and an operation of sharpening a computer screen image and converting a screen image having a low resolution into an image with a high resolution is not appropriate for a general camera-based character recognition system.

SUMMARY OF THE INVENTION

Accordingly, an aspect of the present invention is to solve at least one of the above-mentioned problems occurring in the prior art. A further aim of embodiments of the present invention is to provide a method and apparatus for recognizing a character from a photographed image obtained by photographing a display screen such as a TV screen, a computer screen, and documents such as a newspaper, a book, a magazine, and the like.

According to a first aspect of the present invention, there is provided a character recognizing apparatus based on a photographed image, the apparatus comprising an image determining unit configured to select, from an input image, a Region Of Interest (ROI) to be used for image analysis when the input image is input, and to analyze the selected ROI to determine a type of the input image, an image effect unit configured to apply, to the input image, an image effect for distinguishing a character region and a background region in a display screen if the type of the input image indicates that the input image is obtained by photographing a display screen, a binarizing unit configured to binarize the input image or the output of the image effect unit according to the determined type of the input image, and a character recognizing unit configured to recognize a character from the binarized input image.

According to a second aspect of the present invention, there is provided a character recognizing method based on a photographed image, the method comprising selecting, from an input image, a Region Of Interest (ROI) to be used for image analysis when the input image is input, determining a type of the input image by analyzing the selected ROI, applying, to the input image, an image effect for distinguishing a character region and a background region in a display screen if the type of the input image indicates that the input image is obtained by photographing a display screen, binarizing the input image or the input image with the applied image effect according to the determined type of the input image, and recognizing a character from the binarized input image.

According to another aspect of the invention a computer program is provided, comprising instructions, arranged, when executed, to implement a method and/or apparatus in accordance with any one of the above-described aspects. A further aspect provides machine-readable storage storing such a program.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Hereinafter, embodiments of the present invention are described in detail with reference to the accompanying drawings. In the following description, a detailed description of known functions and configurations is omitted to avoid obscuring the subject matter of the present invention.

Figure 1:
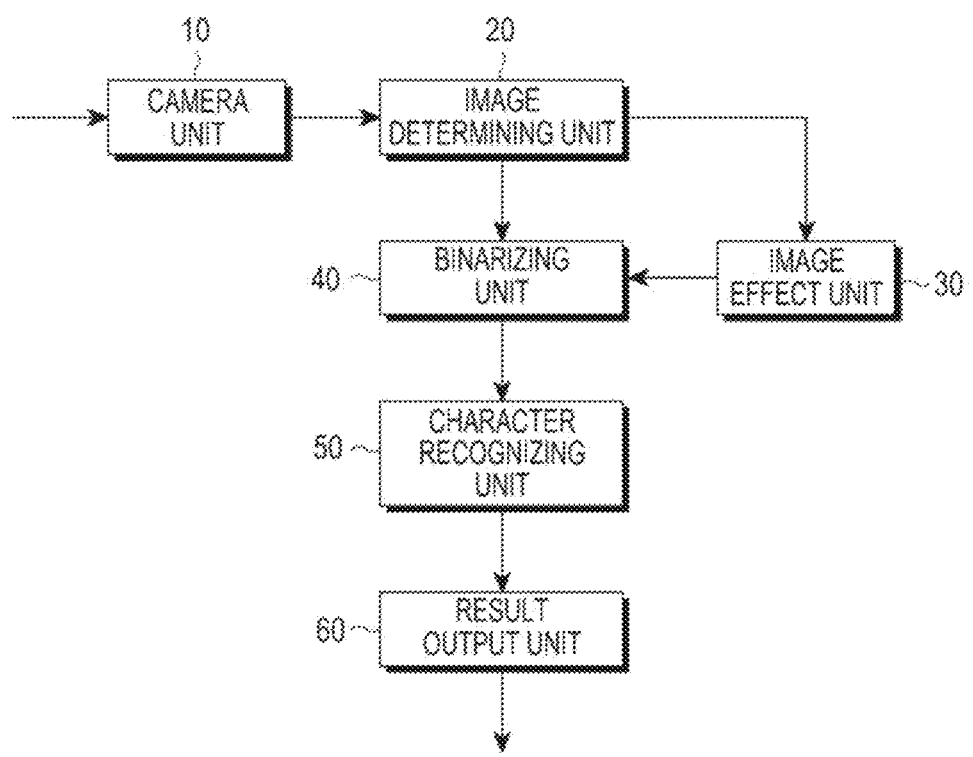
FIG. 1 is a diagram illustrating a character recognizing apparatus according to an embodiment of the present invention.

FIG. 1 illustrates a character recognizing apparatus according to an embodiment of the present invention.

The character recognizing apparatus includes a camera unit 10, an image determining unit 20, an image effect unit 30, a binarizing unit 40, a character recognizing unit 50, and a result output unit 60.

The camera unit 10 outputs an input image by converting an input optical signal into an image frame.

The image determining unit 20 determines a type of a photographed image corresponding to the input image, and outputs the input image to the image effect unit 30 or the binarizing unit 40 based on a result of the determination. For example, the image determining unit 20 determines whether the input image corresponds to an image obtained by photographing a display screen such as a computer screen or a TV screen, or corresponds to an image obtained by photographing a document such as a newspaper, a book, a magazine, and the like. When the result shows that the input image is an image obtained by photographing a display screen, the image determining unit 20 outputs the input image to the image effect unit 30. When the input image is an image obtained by photographing a document, the image determining unit 20 outputs the input image to the binarizing unit 40.

Specifically, the image determining unit 20 may use a frequency domain analysis method and a classifier-based method, to analyze a type of the input image.

First, the frequency domain analysis method may select a Region Of Interest (ROI) in the input image, and extracts a frequency distribution characteristic from the selected ROI to analyze the extracted frequency distribution characteristic. Here, the ROI may refer to a few regions of interest in an entire image region.

Subsequently, the classifier-based method extracts characteristics of an image corresponding to a computer screen and characteristics of remaining images, generates a binary classifier by learning the extracted characteristics through use of a classifier, and applies the binary classifier to a characteristic recognition system.

According to one aspect of the present invention, a Discrete Cosine Transform (DCT) method is applied as the frequency analysis method.

The image effect unit 30 applies a predetermined effect to the input photographed image if the result of the determination indicates that the input image is an image obtained by photographing a display screen, and outputs a modified image. Specifically, the image effect unit 30 applies an image blurring effect, to the photographed image, to decrease a difference in color between a character region and a background region.

The binarizing unit 40 may binarize the modified image (the input image to which the effect is applied) or the photographed image input from the image determining unit 20, to generate a binarized image. Specifically, the binarizing unit 40 performs binarizing on the photographed image, to convert the photographed image into a code that a computer is able to recognize, such as 0 and 1. The binarizing unit 40 converts the input image or the modified image to a binary image. For instance, the binarizing unit 40 may create a binary image (a binarized image) from an image by replacing all pixel values with a brightness, intensity and/or colour above a threshold with a 1 and all others with a 0.

The character recognizing unit 50 recognizes a character from the binarized image. Specifically, the character recognizing unit 50 recognizes a character based on an optical character recognition scheme.

The result output unit 60 outputs a result value of the character recognition.

According to an embodiment of the present invention, whether the input image corresponds to an image obtained by photographing a display screen or an image obtained by photographing a document is determined and thus, a character included in the image obtained by photographing a display screen is accurately recognized.

Figure 2:
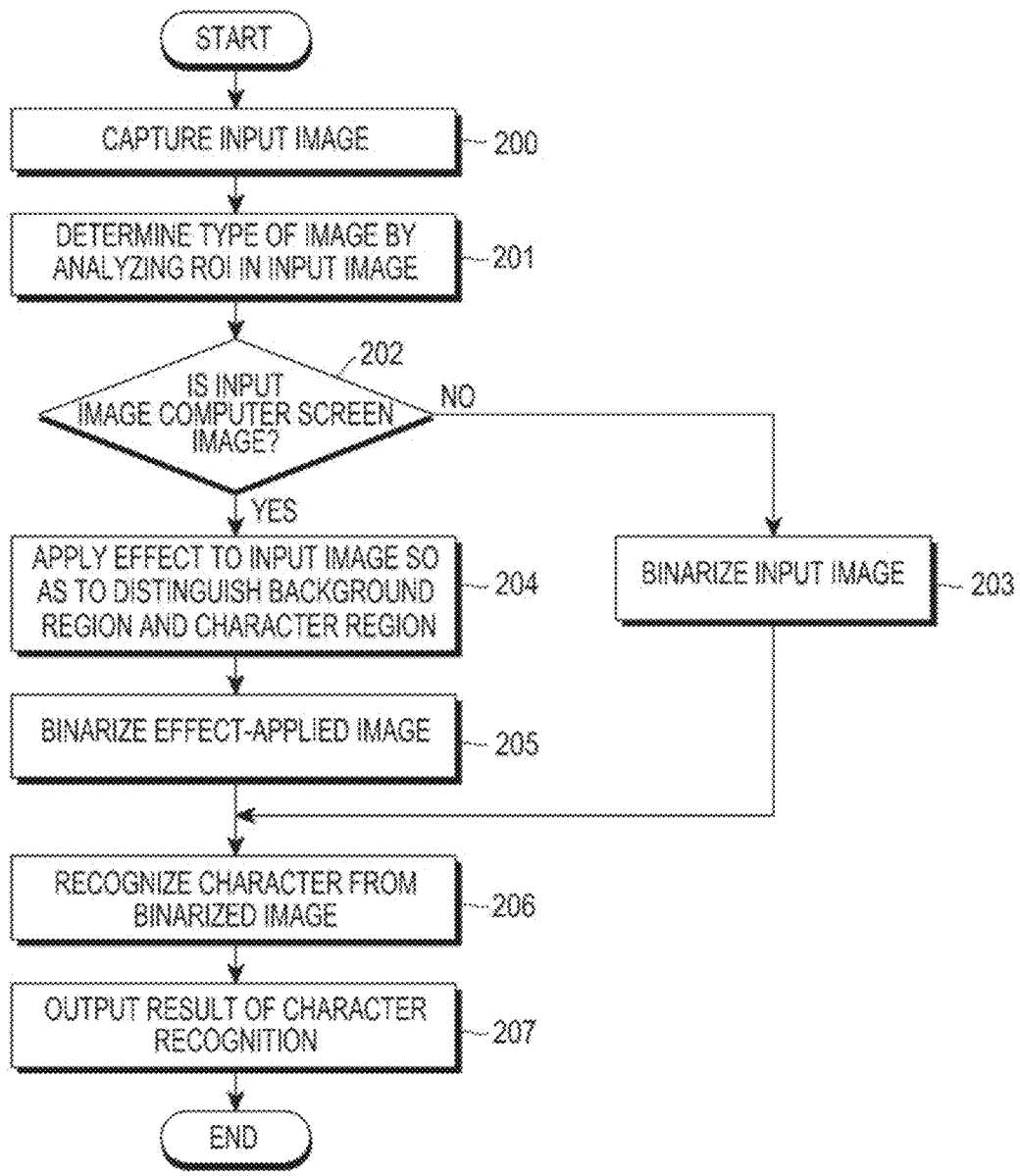
FIG. 2 is a flowchart illustrating a process where a character recognizing apparatus determines a type of an input image and recognizes a character based on a result of the determination according to an embodiment of the present invention.

FIG. 2 illustrates a process where a character recognizing apparatus determines a type of an input image and recognizes a character based on a result of the determination according to an embodiment of the present invention.

In step 200, the camera unit 10 may capture an input image. In step 201, the image determining unit 20 may analyze an ROI in the input image, to determine a type of the input image. For example, the image determining unit 20 determines whether the type of the input image corresponds to a computer screen image obtained by photographing a computer screen or corresponds to remaining images.

In step 202, the image determining unit 20 determines whether the input image is the computer screen image, and may proceed with step 204 when the input image is determined as the computer screen image. When the input image is different from the computer screen image, the image determining unit 20 may proceed with step 203 where the binarizing unit 40 binarizes the input image to generate a binarized image.

In step 204, the image effect unit 30 applies an effect to the input image so that a color difference between a background region and a character region in the input image is reduced. In this example, the effect is a blurring effect.

In step 205, the binarizing unit 40 binarizes the input image to which the effect is applied, to generate the binarized image.

The character recognizing unit 50 that proceeds with steps 203 through 206 recognizes a character from the generated binarized image. In this example, the recognition is performed based on an OCR scheme.

In step 207, the result output unit 60 outputs a result of the character recognition, and may complete a character recognition process.

According to an embodiment of the present invention, it is determined whether the input image corresponds to an image obtained by photographing a display screen or an image obtained by photographing a document and thus, a character included in the image obtained by photographing the display screen is accurately recognized.

Operations of the image determining unit 20 that determines a type of the input image will be described with reference to FIGS. 3 through 10. According to an embodiment of the present invention, the image determining unit 20 may analyze an image based on a DCT method.

Figure 3:
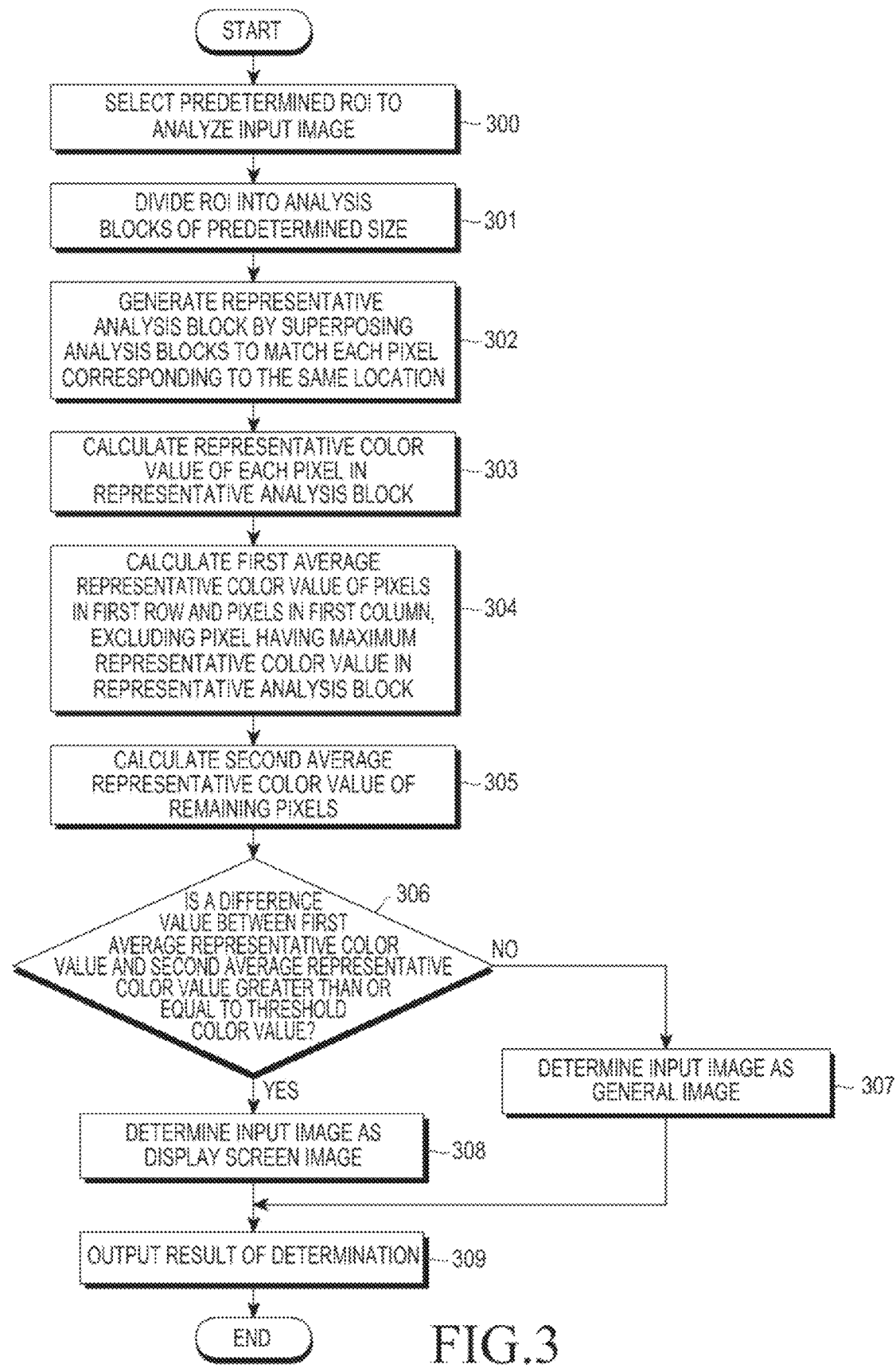
FIG. 3 is a flowchart illustrating a process where an image determining unit determines a type of an input image according to an embodiment of the present invention.

FIG. 3 illustrates a process where an image determining unit determines a type of an input image according to an embodiment of the present invention. FIGS. 4 through 10 illustrate a process where an image determining unit determines a type of an input image according to an embodiment of the present invention.

Figure 4:
FIGS. 4 through 10 are diagrams illustrating a process where an image determining unit determines a type of an input image according to an embodiment of the present invention.
Figure 5:

Referring to FIG. 3, the image determining unit 20 may select, from an input image, a predetermined ROI to analyze a type of an image in step 300. For example, the image determining unit 20 may select an ROI 400 having a predetermined size from the input image as illustrated in FIG. 4. Generally, a resolution of a camera image is greater than a resolution of a display screen and thus, the ROI 400 may have a lattice noise as illustrated in FIG. 5.

Figure 6:
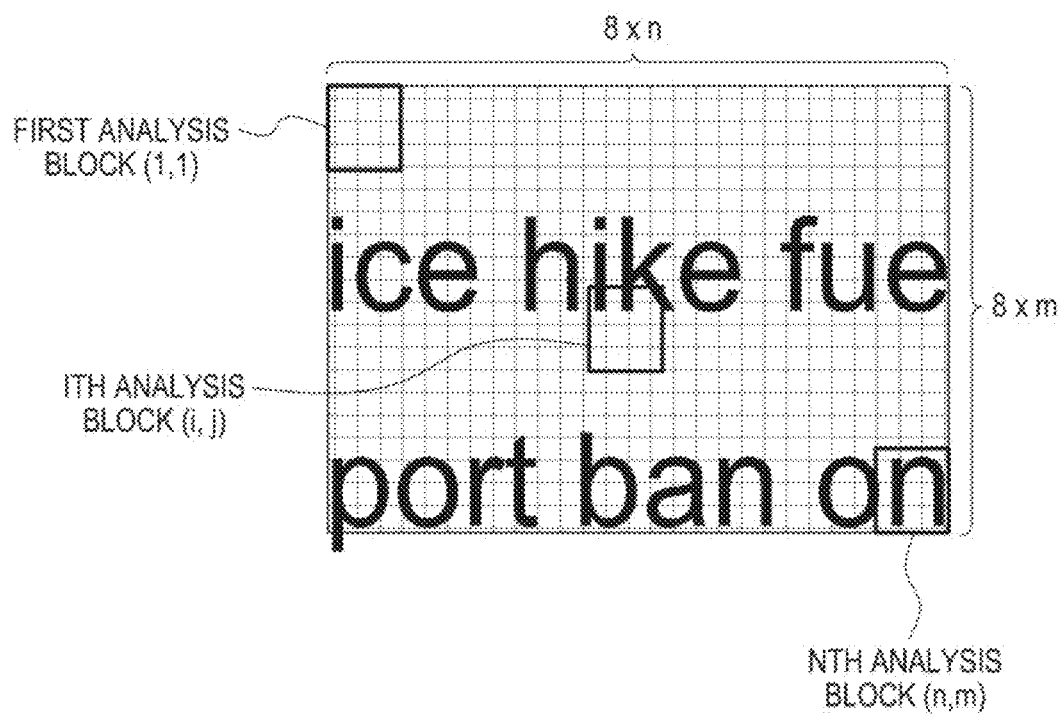

In step 301, the image determining unit 20 may divide the ROI 400 into analysis regions of a predetermined size. For example, the image determining unit 20 may divide an ROI, 8×n pixels in width and 8×m pixels in height, into analysis blocks of a predetermined size, such as a first analysis block that has a predetermined size and is located in a first row and a first column, an $i^{th}$ analysis block that has a predetermined size and is located in an $i^{th}$ row and an $j^{th}$ column, and an $n^{th}$ analysis block that has a predetermined size and is located in an $n^{th}$ row and an $m^{th}$ column, as illustrated in FIG. 6. Here, i, j, n and m are positive integers.

The size of the ROI is set to a multiple of an 8×8 DCT analysis block, or set to have a form of another DCT analysis block. Also, one or more ROIs may be set.

Figure 7:
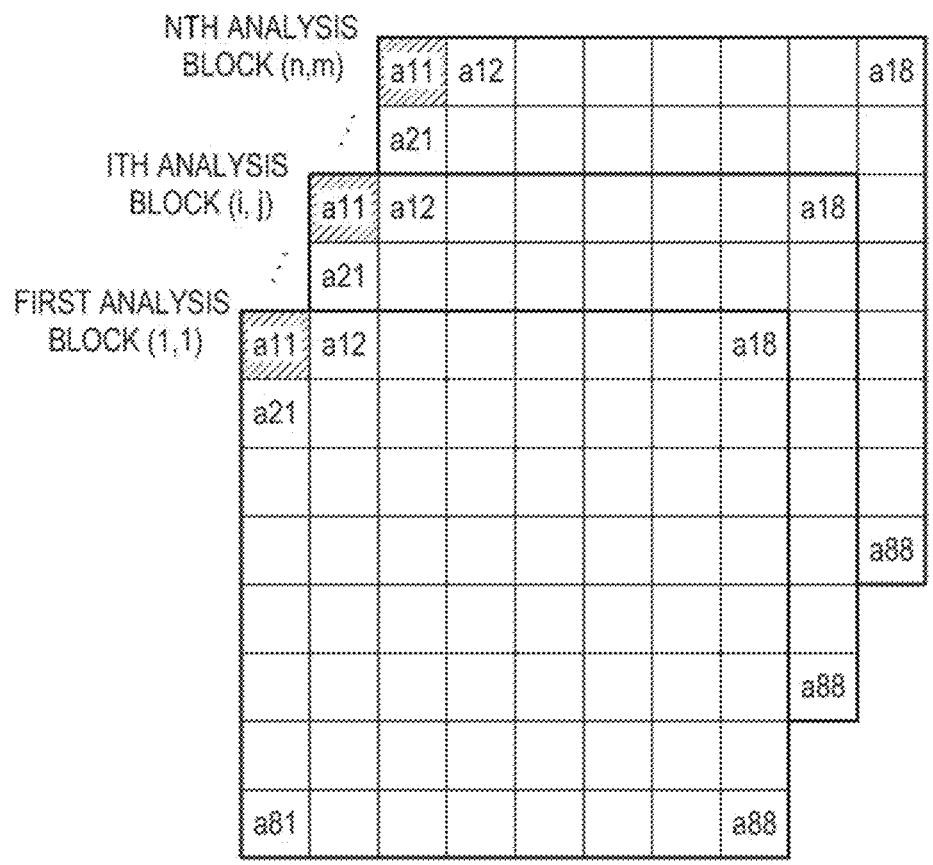
Figure 8:
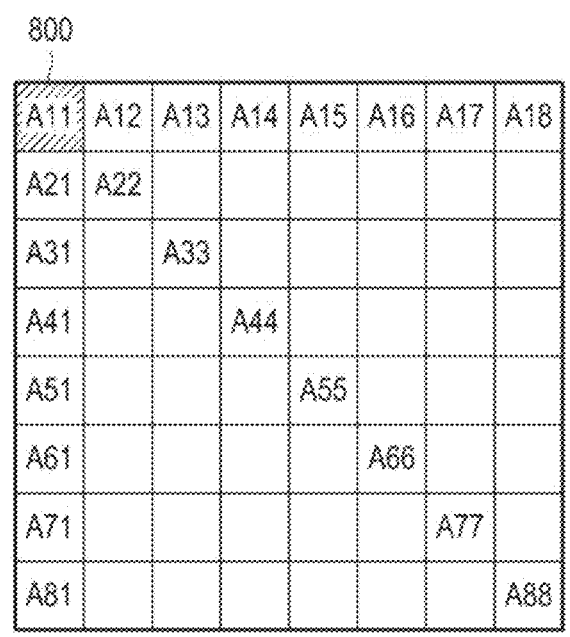
Figure 9:
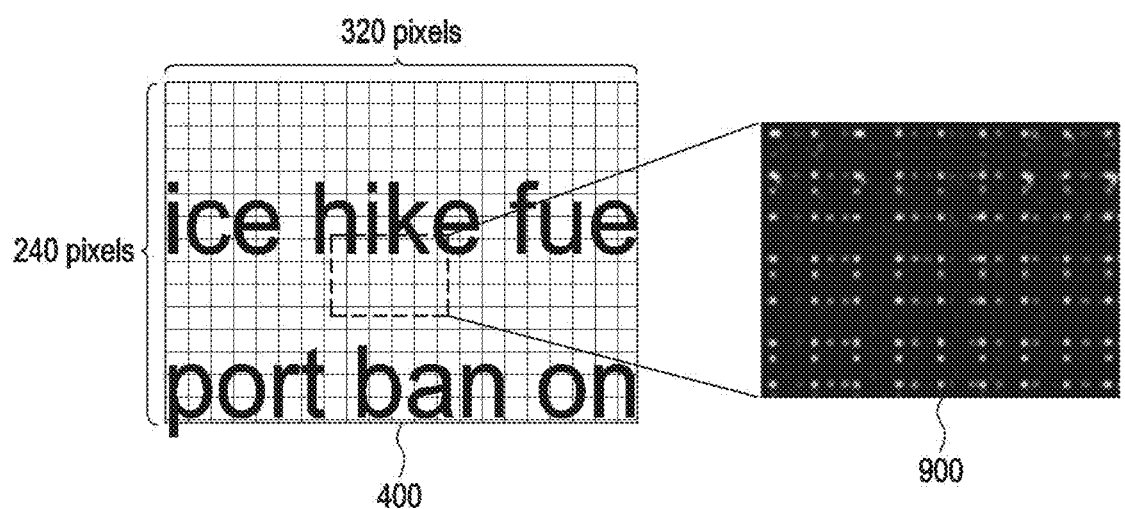

In step 302, the image determining unit 20 generates a representative analysis block by superposing the divided analysis blocks to match each pixel corresponding to the same location. Specifically, the image determining unit 20 may superpose the first analysis block, . . . , the $i^{th}$ analysis block, . . . , and the $n^{th}$ analysis block so that pixels in the same location of the analysis blocks may match, and may a generate a representative analysis block as illustrated in FIG. 7 and FIG. 8. In this example, the image determining unit 20 performs superposing so that a pixel corresponding to a location of all of the first analysis block, . . . , a pixel corresponding to a location of all of the $i^{th}$ analysis block, . . . , and a pixel corresponding to a location of all of the $n^{th}$ analysis block may match, and pixels corresponding to remaining locations may match in this manner and thus, generates the representative analysis block.

In step 303, the image determining unit 20 calculates a representative color value for each pixel in the generated representative analysis block. Specifically, the image determining unit 20 may calculate a total sum of color values of corresponding pixels of the superposed analysis blocks, for example, the first analysis block, . . . , the $i^{th}$ analysis block, . . . , and the $n^{th}$ analysis block, as a representative color value for each pixel in the representative analysis block. For example, a representative color value for a pixel corresponding to a location of A11 of FIG. 8 is represented by a total sum of a color value of a pixel corresponding to a location of all of the first analysis block, . . . , a color value of a pixel corresponding to a location of all of the $i^{th}$ analysis block, . . . , and a color value of a pixel corresponding to a location of all of the $n^{th}$ analysis block.

In step 304, the image determining unit 20 calculates a first average representative color value of pixels corresponding to a location of a first row and pixels corresponding to a location of a first column, excluding a pixel having a maximum representative color value in the representative analysis block. In this example, the pixels corresponding to the first row and the pixels corresponding to the first column may indicate pixels included in a row and pixels included in a column where pixels having relatively high representative color values exist. Generally, a display screen image to which a DCT analysis method is applied may have DCT analysis pattern blocks such as a predetermined region 900 of the ROI 400 in FIG. 9. The DCT analysis pattern block may correspond to an analysis block, and a pixel corresponding to a first row and a first column, such as a pixel located in a location of A11 of FIG. 8, may have a maximum representative color value.

Figure 10:
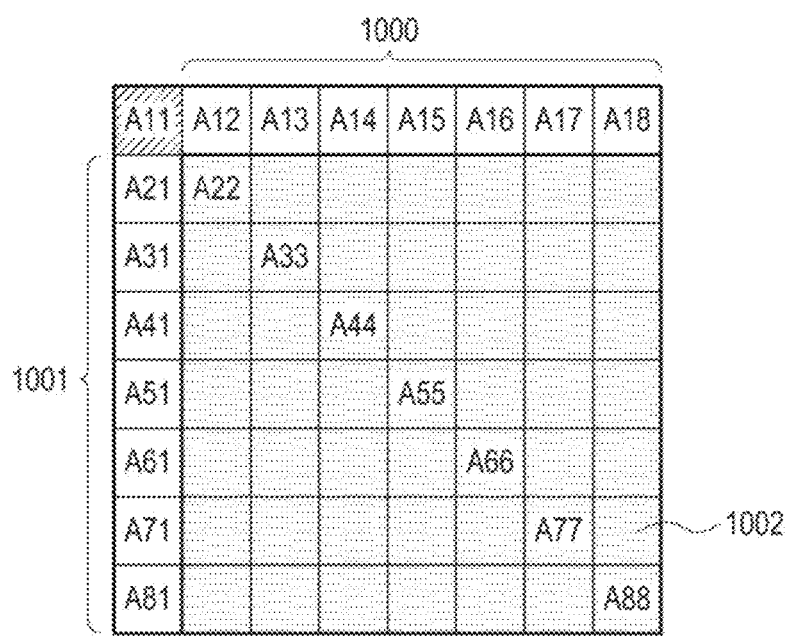

That is, the image determining unit 20 calculates the first average representative color value of pixels corresponding to A12, A13, . . . , and A18 1000, and pixels corresponding to A21, A31, . . . , and A81 1001, excluding a pixel corresponding to A11, as illustrated in FIG. 10.

In step 305, the image determining unit 20 may calculate a second average representative color value of remaining pixels in the representative analysis block. Specifically, the image determining unit 20 calculates the second average representative color value of pixels corresponding to A22, A23, . . . , A32, A33, . . . , A42, A43, . . . , A52, A53, . . . , A62, A63, . . . , A72, A73, . . . , A82, A83, . . . , A88 1002, as illustrated in FIG. 10.

In step 306, the image determining unit 20 determines whether a difference value between the first average representative color value and the second average representative color value is greater than or equal to a predetermined threshold color value, and may proceed with step 308 when the difference value is greater than or equal to the predetermined threshold color value. Otherwise, the image determining unit 20 determines the input image as a general image in step 307. Here, the predetermined threshold color value is a predetermined reference value to be used for determining whether the input image is a display screen image.

In step 308, the image determining unit 20 determines the input image as a display screen image such as a computer screen image.

In step 309, the image determining unit 20 outputs a result of the determination, and may complete an image determining process.

Figure 11:
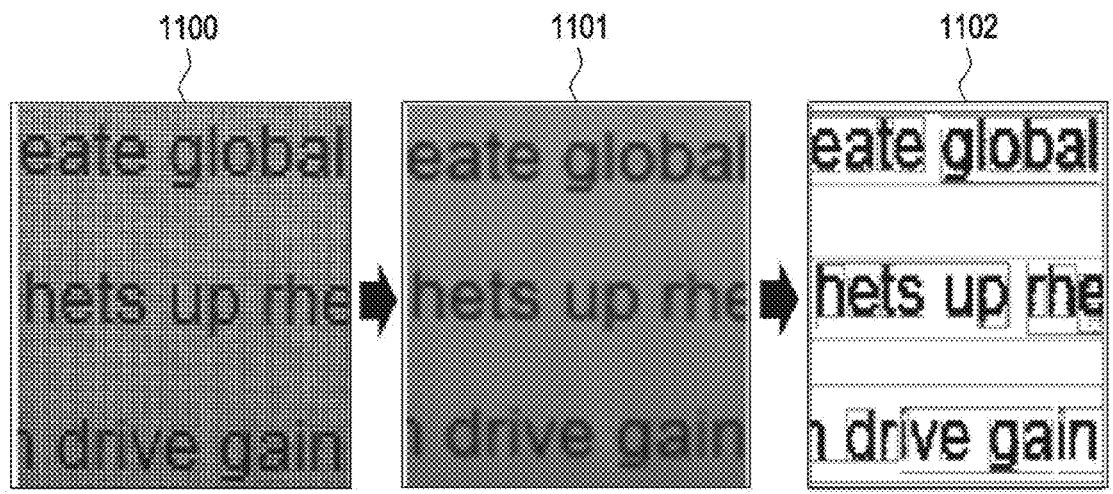
FIG. 11 is a diagram illustrating a process where an image effect unit applies an effect to an input image according to an embodiment of the present invention.

FIG. 11 illustrates a process where an image effect unit applies an effect to an input image according to an embodiment of the present invention.

Referring to FIG. 11, the image effect unit 30 generates an effect-applied image 1101 obtained by applying a blurring effect to an input image 1100, to clearly distinguish a character region and a background region. Noise, such as a lattice noise, may occur in the input image 1100 as illustrated in FIG. 11 and thus, the character region may not be accurately recognized when character recognition is performed on the input image 1100. Accordingly, the image effect unit 30 applies an image blurring effect so that a difference value between a color value of the character region and a color value of the background region is greater than or equal to a predetermined threshold difference value and thus, the character region and the background region are clearly distinguished. The effect-applied image 1101 may minimize noise such as a lattice noise as illustrated in FIG. 11 and thus, a character and a background is clearly distinguished from each other. When the effect-applied image 1101 is binarized through the binarizing unit 40, a binarized image 1102 is generated as illustrated in FIG. 11. In the binarized image 1102, the character region is distinctly distinguished from the background region so that the character region is clearly recognized.

Figure 12:
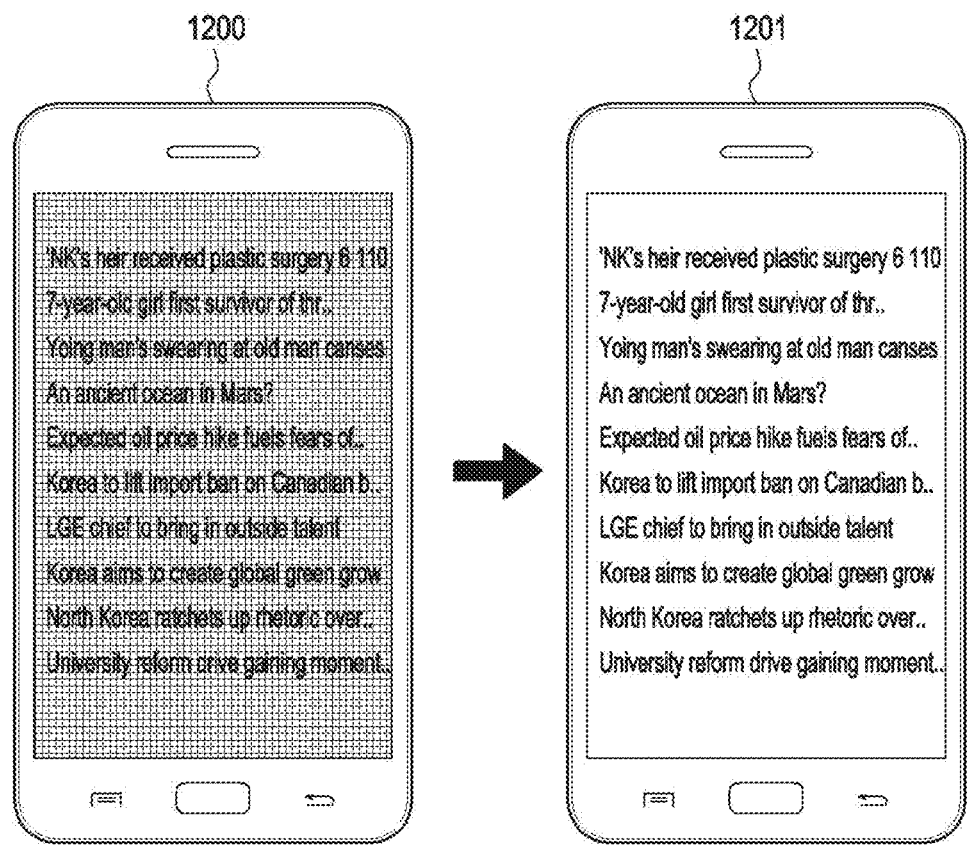
FIG. 12 is a diagram illustrating a result of character recognition output by a result output unit according to an embodiment of the present invention.

FIG. 12 illustrates a result of character recognition output by a result output unit according to an embodiment of the present invention.

When an image 1200 obtained by photographing a computer screen is input as illustrated in FIG. 12, a type of the input image is determined through the processes described above, and the result output unit 60 outputs a result image 1201 of character recognition performed through use of a character recognition method based on a result of the determination.

Figure 13:
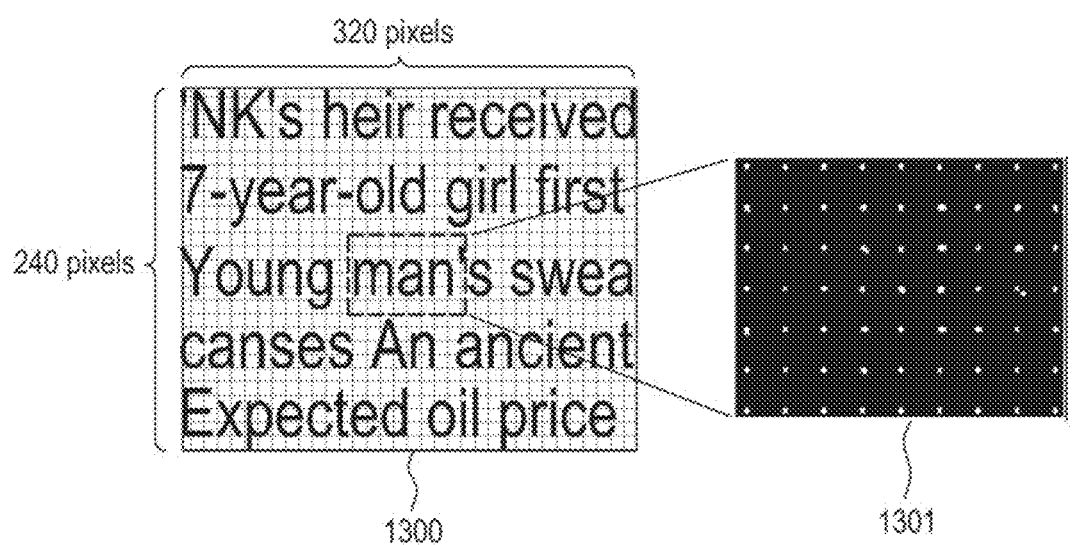
FIG. 13 is a diagram illustrating an example when an input image is determined by an image determining unit as an image obtained by photographing a document according to an embodiment of the present invention.

FIG. 13 illustrates an example when an input image is determined by an image determining unit as an image obtained by photographing a document according to an embodiment of the present invention.

Referring to FIG. 13, the image determining unit 20 may select a predetermined ROI from an input image 1300, and determines a type of the input image 1300 by analyzing the ROI. In this example, when the input image is an image obtained by photographing a document, DCT analysis pattern blocks such as a block 1301 is obtained by analyzing the ROI based on a DCT analysis method.

The image determining unit 20 determines the input image 1300 as a document image by analyzing the DCT analysis pattern blocks.

According to an embodiment of the present invention, whether the input image corresponds to an image obtained by photographing a display screen or an image obtained by photographing a document is determined and thus, a character included in the image obtained by photographing the display screen may be accurately recognized.

According to an embodiment of the present invention, character information displayed on a screen that variably displays various information is readily shared through use of a portable terminal without complex processes, for example, a process for wireless connection or Internet access.

According to an embodiment of the present invention, characters displayed on a display screen are conveniently recognized through use of a portable terminal.

It will be appreciated that embodiments of the present invention can be implemented in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention.

Accordingly, embodiments of the present invention provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith.

It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

While the invention has been shown and described with reference to certain various embodiments thereof, it will be understood by those skilled in the art that various changes in form and detail may be made therein without departing from the scope of the invention as defined by the appended claims.

What is claimed is:

1. An apparatus for recognizing a character based on a photographed image, the apparatus comprising:
   an image determining unit configured to select, from an input image, a region of image analysis (ROI) to be used for image analysis when the input image is input, and to analyze the selected region of image analysis to determine a type of the input image;
   an image effect unit configured to apply, to the input image, an image effect for distinguishing a character region and a background region in a display screen if the type of the input image indicates that the input image is obtained by photographing a display screen;
   a binarizing unit configured to binarize the input image or the output of the image effect unit according to the determined type of the input image; and
   a character recognizing unit configured to recognize a character from the binarized input image.

2. The apparatus of claim 1, wherein the image determining unit is configured to divide the selected region of image analysis into analysis blocks of a predetermined size, to generate a representative analysis block by superposing the divided analysis blocks to match each pixel corresponding to a same location, to calculate a representative color value of each pixel included in the representative analysis block, and to analyze the input image based on each calculated representative color value.

3. The apparatus of claim 2, wherein the image determining unit is configured to calculate a first average representative color value of pixels included in a row and a column where pixels having relatively high representative color values exist in the representative analysis block, excluding a pixel having a maximum representative color value in the representative analysis block, to calculate a second average representative color value of remaining pixels, to compare the first average representative color value and the second average representative color value, and to determine the type of the input image based on a result of the comparison.

4. The apparatus of claim 3, wherein the image determining unit is configured to determine whether a difference value between the first average representative color value and the second average representative color value is greater than or equal to a predetermined threshold color value, to determine the input image as a display screen image when the difference value is greater than or equal to the threshold color value, and to determine the input image as an image different from the display screen image when the difference value is less than the threshold color value.

5. The apparatus of claim 1, wherein the image effect unit is configured to apply a blurring effect to the input image so that a difference value between a color value of the character region and a color value of the background region in the input image is greater than or equal to a predetermined threshold difference value.

6. A method of recognizing a character based on a photographed image, the method comprising:
   selecting, from an input image, a region of image analysis to be used for image analysis when the input image is input;
   determining a type of the input image by analyzing the selected region of image analysis;

applying, to the input image, an image effect for distinguishing a character region and a background region in a display screen if the type of the input image indicates that the input image is obtained by photographing a display screen;

binarizing the input image or the input image with the applied image effect according to the determined type of the input image; and recognizing a character from the binarized input image.

7. The method of claim 6, wherein determining the type of the input image comprises:

dividing the selected region of image analysis into analysis blocks of a predetermined size;

generating a representative analysis block by superposing the divided analysis blocks to match each pixel corresponding to a same location;

calculating a representative color value of each pixel included in the representative analysis block; and analyzing the input image based on each calculated representative color value.

8. The method of claim 7, wherein analyzing the input image comprises:

calculating a first average representative color value of pixels included in a row and a column where pixels having relatively high representative color values exist in the representative analysis block, excluding a pixel having a maximum representative color value in the representative analysis block;

calculating a second average representative color value of remaining pixels; and comparing the first average representative color value and the second average representative color value to determine a type of the input image based on a result of the comparison.

9. The method of claim 8, wherein determining the type of the input image comprises:

determining whether a difference value between the first average representative color value and the second average representative color value is greater than or equal to a predetermined threshold color value;

determining the input image as a display screen image when the difference value is greater than or equal to the threshold color value; and determining the input image as an image different from the display screen image when the difference value is less than the threshold color value.

10. The method of claim 6, wherein applying the image effect for distinguishing the character region and the background region comprises:

applying a blurring effect to the input image so that a difference value between a color value of the character region and a color value of the background region in the input image is greater than or equal to a predetermined threshold difference value.

\* \* \* \* \*